(12) United States Patent
Yamamoto et al.

(10) Patent No.: US 7,671,558 B2
(45) Date of Patent: Mar. 2, 2010

(54) INDUCTION MOTOR CONTROLLER

(75) Inventors: Kouki Yamamoto, Hitachinaka (JP);
Toshiaki Okuyama, Tokai (JP);
Hiroyuki Tomita, Funabashi (JP);
Yoshitaka Iwaji, Hitachinaka (JP);
Koichiro Nagata, Mito (JP)

(73) Assignee: Hitachi Industrial Equipment Systems Co., Ltd., Tokyo (JP)

( * ) Notice: Subject to any disclaimer, the term of this patent is extended or adjusted under 35 U.S.C. 154(b) by 230 days.

(21) Appl. No.: 11/843,686

(22) Filed: Aug. 23, 2007

(65) Prior Publication Data

US 2008/0169783 A1    Jul. 17, 2008

(30) Foreign Application Priority Data

Jan. 15, 2007    (JP)    ............... 2007-005578

(51) Int. Cl.
*H02P 27/04*    (2006.01)
(52) U.S. Cl. .................. 318/802; 318/727; 318/805; 318/812; 318/825
(58) Field of Classification Search ................ 318/727, 318/767, 778, 782, 800, 802, 805, 807, 808, 318/812, 825
See application file for complete search history.

(56) References Cited

U.S. PATENT DOCUMENTS

| | | | | |
|---|---|---|---|---|
| 4,451,771 A | * | 5/1984 | Nagase et al. | 318/800 |
| 4,808,903 A | * | 2/1989 | Matsui et al. | 318/800 |
| 5,841,263 A | * | 11/1998 | Kaneko et al. | 318/807 |
| 5,877,607 A | * | 3/1999 | Masaki et al. | 318/807 |
| 6,300,741 B1 | * | 10/2001 | Okuyama | 318/799 |
| 6,335,605 B1 | | 1/2002 | Negoro | |
| 6,670,786 B2 | * | 12/2003 | Tobari et al. | 318/805 |
| 6,809,492 B2 | * | 10/2004 | Harakawa et al. | 318/609 |
| 6,861,813 B2 | * | 3/2005 | Yoshimoto et al. | 318/432 |
| 7,385,371 B2 | * | 6/2008 | Kitanaka | 318/727 |
| 7,545,116 B2 | * | 6/2009 | Nagata et al. | 318/807 |
| 2006/0192521 A1 | * | 8/2006 | Nagata et al. | 318/807 |

FOREIGN PATENT DOCUMENTS

| | | |
|---|---|---|
| JP | 06-105580 | 4/1994 |
| JP | 06-284771 | 10/1994 |
| JP | 08-317698 | 11/1996 |
| JP | 09-191699 | 7/1997 |
| KR | 2001-67062 | 7/2001 |

\* cited by examiner

*Primary Examiner*—Bentsu Ro
*Assistant Examiner*—Thai Dinh
(74) *Attorney, Agent, or Firm*—Antonelli, Terry, Stout & Kraus, LLP.

(57) ABSTRACT

The present invention provides an induction motor controller which includes: a circuit for generating a d-axis current reference signal from a d-axis current command value and a periodically varying periodic signal; a d-axis current controller for controlling a d-axis motor current flowing through an induction motor to be controlled to match the d-axis current reference signal; parameter determining means for calculating and determining a motor parameter of the induction motor based on a deviation of the d-axis motor current from the d-axis current reference signal, and controlling a voltage applied to the induction motor using a compensation voltage calculated from the calculated and determined motor parameter, in which a control parameter for controlling the induction motor is set based on the calculated and determined motor parameter.

13 Claims, 6 Drawing Sheets

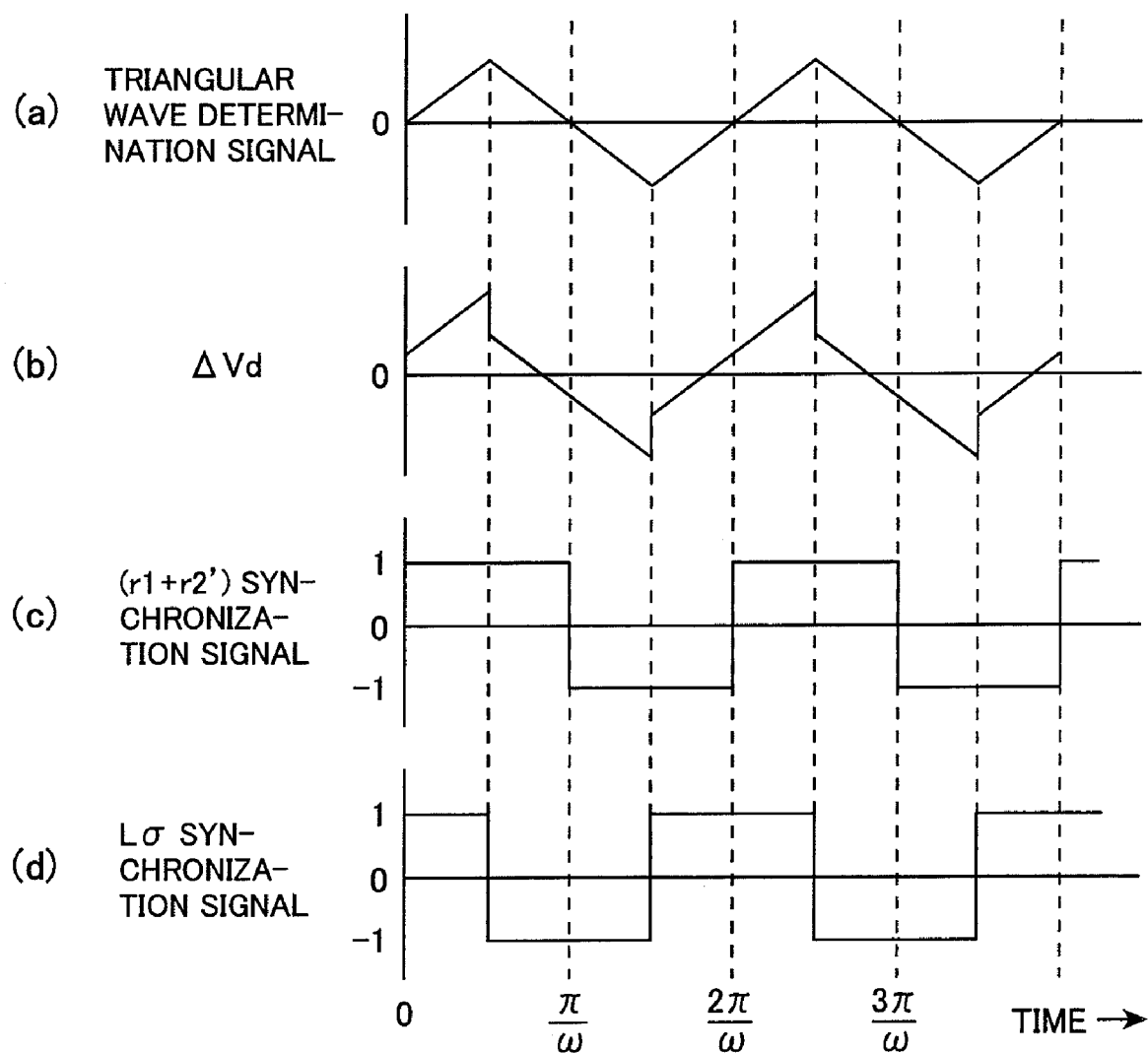

INDUCTION MOTOR CONTROLLER

CLAIM OF PRIORITY

The present application claims priority from Japanese application serial No. 2007-005578, filed on Jan. 15, 2007, the content of which is hereby incorporated by reference into this application.

FIELD OF THE INVENTION

The present invention relates to induction motor controllers using motor parameters.

BACKGROUND OF THE INVENTION

The rotating torque of an induction motor is produced by an interaction between a rotating magnetic field generated by its stator winding and an induced current flowing through its rotor winding. The rotor and stator windings are represented by a motor equivalent circuit, in which the motor parameters of primary and secondary resistances and leakage inductance determine the voltage-current characteristics of the induction motor.

Methods for controlling a motor described in Patent Documents 1 to 3 use motor parameters set in a controller to control the output currents and voltages of an inverter such that the actual velocity follows the rotational velocity command value $\omega r^*$. Such controls can obtain a good controllability only when actual values of the parameters such as the primary resistance in the motor equivalent circuit match the motor parameters used for the control. Patent Documents 4 discloses a technique which determines the motor parameters and set control parameters in the controller based on the determined results. This parameter determining method determines the primary resistance and leakage inductance based on the deviation of an actual d-axis current from a d-axis current command value. In this method, the primary resistance is determined under a specific operating condition in which at least one of the frequency command value and q-axis current is less than a predetermined value, while the leakage inductance is determined under a specific operating condition in which the frequency command value and q-axis current are both no less than a predetermined value.

[Patent Document 1] Japanese Patent Laid-open No. Hei 6 (1994)-105580

[Patent Document 2] Japanese Patent Laid-open No. Hei 6 (1994)-284771

[Patent Document 3] Japanese Patent Laid-open No. Hei 8 (1996)-317698

[Patent Document 4] Japanese Patent Laid-open No. Hei 9 (1997)-191699

SUMMARY OF THE INVENTION

However, an actual motor parameter varies with the temperature of a motor. A deviation of the actual value of a motor parameter from the parameter set in a controller caused by this motor parameter variation may degrade the controllability or destabilize the control. In addition, the method of the above Patent Documents 4 has a problem in that each motor parameter is not determined until all of them have been determined, thus requiring longer time for the determination. Further, if the operating condition required for measuring motor parameters is not satisfied, the motor parameters cannot be determined, which may result in a poorer accuracy depending on the operating condition. Furthermore, the controller performs the determination based on a variation in the basic wave component of the d-axis current; therefore, the determination accuracy is degraded in the event of an error introduction caused by the dead time of the inverter or on-state voltage drop in the inverter devices because such error cannot be separated from the parameter variation.

An object of the present invention is to provide an induction motor controller which overcomes such problems and can prevent degradation in controllability due to variation in an actual value of a motor parameter.

To solve the above problems, the present invention provides an induction motor controller which includes: a circuit for generating a d-axis current reference signal from a d-axis current command value and a periodically varying periodic signal; a d-axis current controller for controlling a d-axis motor current flowing through an induction motor to be controlled to match the d-axis current reference signal; parameter determining means for calculating and determining a motor parameter of the induction motor based on a deviation of the d-axis motor current from the d-axis current reference signal, and controlling a voltage applied to the induction motor using a compensation voltage calculated from the calculated and determined motor parameter, in which a control parameter for controlling the induction motor is set based on the calculated and determined motor parameter.

The present invention can prevent degradation in controllability due to variation in an actual value of a motor parameter.

BRIEF DESCRIPTION OF THE DRAWINGS

FIG. 6 illustrates waveforms of a triangular wave determination signal and synchronization signals of a modification of the invention.

DESCRIPTION OF THE PREFERRED EMBODIMENTS

A First Embodiment

An induction motor controller according to a first embodiment of the invention will be described with reference to FIGS. 1, 2 and 3.

Figure 1:
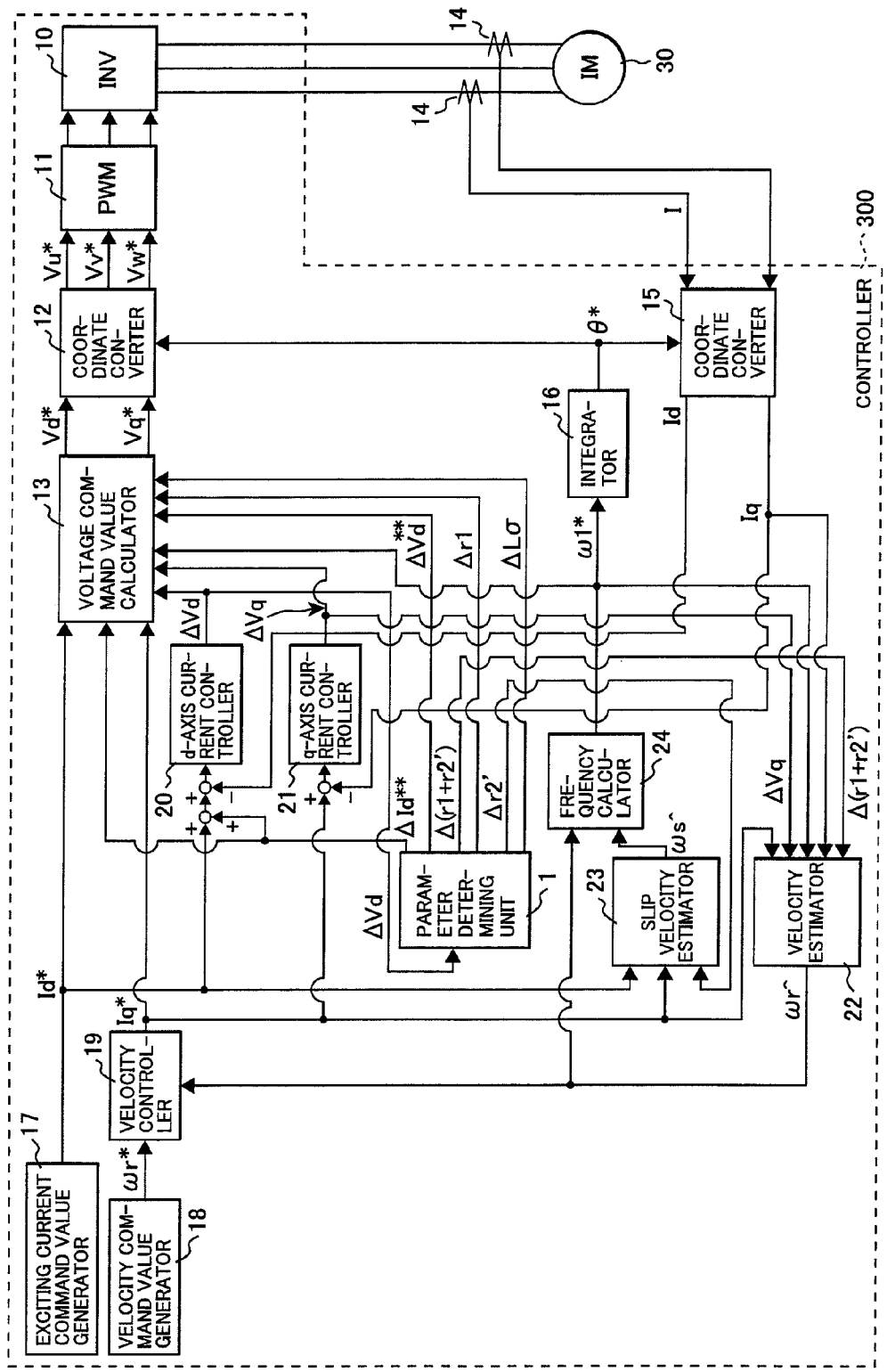
FIG. 1 is a block diagram of a induction motor according to a first embodiment of the invention.

In a block diagram of FIG. 1, a three-phase induction motor 30 is connected to an induction motor controller 300 where a current detector 14 detects a current I of the induction motor 30. The current detector 14 detects currents in two of the U phase, V phase, and W phase. Here, the current in the other phase can be uniquely determined because the sum of the currents in the three phases is equal to zero.

The induction motor controller 300 controls an inverter (INV) 10 so as to drive the induction motor 30 to achieve target values of a d-axis current command value Id* generated by an exciting current command value generator 17 and a velocity command value $\omega r^*$ generated by a velocity command value generator 18. The function of the inverter 10 is provided by power switching devices, while the below described functions are each realized by: a computer including a CPU (Central Processing Unit), ROMs (Read Only Memory), RAMs (Random Access Memory) and others; and a program stored in a ROM, a RAM or the like.

The rotating torque of the induction motor 30 is produced by an interaction between a rotating magnetic field generated by its stator winding and an induced current flowing through its rotor winding when it slips. The coordinate converter 12 inputs: a d-axis voltage command value Vd* for the d-axis which is the exciting axis (magnetic flux axis); and a q-axis voltage command value Vq* for the q-axis perpendicular to the d-axis, and generates three-phase voltage command values Vu*, Vv* and Vw*, based on which a PWM (Pulse Width Modulation) converter 11 PWM controls the inverter 10 to output voltages to the induction motor 30.

The d-axis voltage command value Vd* and q-axis voltage command value Vq* are generated from multiple signals including: a q-axis current command value Iq* obtained at a velocity controller 19 from a rotational velocity estimate ωr^ and the velocity command value ωr*; the d-axis current command value Id*; a voltage difference ΔVd outputted from a d-axis current controller 20; and a voltage difference ΔVq outputted from a q-axis current controller 21. Here, the voltage variation ΔVd is generated from a deviation of a d-axis motor current Id from a d-axis current reference signal that is the sum of the Id* value and a periodically varying periodic signal ΔId**, while the voltage variation ΔVq is generated from a deviation of a q-axis motor current Iq from the Iq* value. And, the motor is controlled such that Id=Id* and Iq=Iq*.

In addition, a coordinate converter 15 calculates the d-axis motor current Id and q-axis current motor Iq from the motor current I, while a velocity estimator 22 estimates an angular velocity of the induction motor 30 from the q-axis voltage variation ΔVq, an angular frequency command value ω1*, and the Iq* and Iq values and outputs the angular velocity estimate ωr^. A slip velocity estimator 23 calculates a motor slip velocity estimate ωs^ from the Id* and Iq* values, while a frequency calculator 24 inputs the ωr^ value and slip velocity estimate ωs^, calculates an equation: ω1*=ωr^+ωs^, and outputs the angular frequency command value ω1*. Further, an integrator 16 converts the ω1* value to an angle command value θ*, which is in turn inputted to the coordinate converters 12 and 15.

A parameter determining unit 1, which is a configuration feature of the embodiment, generates the periodic signal ΔId, which is used together with the output signal ΔVd to determine variations in the motor 30 parameters. The motor parameters include a primary resistance r1, secondary resistance r2' converted to the primary side and leakage inductance Lσ in the equivalent circuit of the induction motor 30. Further, the parameter determining unit 1 outputs a voltage compensation value ΔVd based on the determined motor parameters. Furthermore, the motor parameter variations Δ(r1+r2'), Δr1, Δr2' and ΔLσ determined by the parameter determining unit 1 are, each time the parameters vary, inputted to a voltage command value calculator 13, the velocity estimator 22 and the slip velocity estimator 23 to reset (recorrect) the motor parameters.

Each of these functions will be now described.

The d-axis current command value Id*, q-axis current command value Iq* and voltage variations ΔVd and ΔVq are inputted to the voltage command value calculator 13, which in turn calculates the output voltage command values Vd* and Vq* using equations (1) and (2).

$$Vd^* = r1^* \cdot Id^* - \omega1^* \cdot L\sigma^* \cdot Iq^* + \Delta Vd \quad (1)$$

$$Vq^* = r1^* \cdot Iq^* + \omega1^* \cdot L\sigma^* \cdot Id^* + \omega1^* \cdot (M^*/L2^*) \cdot \phi2d^* + \Delta Vq \quad (2)$$

Here, r1*, Lσ*, M*, L2*, and φ2d* are, respectively, a primary resistance set value, leakage inductance set value, mutual inductance set value, secondary inductance set value and d-axis secondary magnetic flux command value of the induction motor 30.

On the other hand, the induction motor 30 generally satisfies equations (3), (4), (5) and (6). In the equations, symbols without an asterisk (*) represent actual values of the motor parameters. And, r2, r2' in the equation (7), φ2q, ωs, T2 in the equation (8) and s represents a secondary resistance, the secondary resistance converted the primary side, a q-axis secondary magnetic flux, a slip velocity, a motor secondary time constant and the differential operator, respectively. And, L2, M and Lσ are a secondary inductance, a mutual inductance and the leakage inductance, respectively.

$$Vd = (r1 + L\sigma \cdot s) \cdot Id - \omega1 \cdot L\sigma \cdot Iq + s \cdot (M/L2) \cdot \phi2d - \omega1 \cdot (M/L2) \cdot \phi2q \quad (3)$$

$$Vq = \omega1 \cdot L\sigma \cdot Id + (r1 + L\sigma \cdot s) \cdot Iq + \omega1 \cdot (M/L2) \cdot \phi2d + s \cdot (M/L2) \cdot \phi2q \quad (4)$$

$$\phi2d = (M \cdot Id + \omega s \cdot T2 \cdot \phi2q)/(1 + T2 \cdot s) \quad (5)$$

$$\phi2q = (M \cdot Iq - \omega s \cdot T2 \cdot \phi2d)/(1 + T2s) \quad (6)$$

$$r2' = (M/L2)^2 \cdot r2 \quad (7)$$

$$T2 = L2/r2 \quad (8)$$

Further, it is assumed that the q-axis secondary magnetic flux φ2q satisfies an equation (9) such that the secondary magnetic flux is oriented parallel to the d-axis.

$$\phi2q = 0 \quad (9)$$

In this case, under a steady state (s=0), substituting the equation (9) into the equation (5) gives an equation (10) for the d-axis secondary magnetic flux φ2d.

$$\phi2d = M \cdot Id \quad (10)$$

In addition, combining the equations (6) and (10) yields an equation (11) for the slip velocity estimate ωs^.

$$\omega s^{\wedge} = M \cdot Iq/(T2 \cdot \phi2d) = Iq^*/(T2 \cdot Id^*) \quad (11)$$

The slip velocity estimator 23 outputs the slip velocity estimate ωs^ of the induction motor 30 according to the equation (11).

The velocity estimator 22 calculates the angular velocity estimate ωr^ from the values of Iq and Iq* and the q-axis voltage variation ΔVq according to the equation (12).

$$\omega r^{\wedge} = 1/(1+T1 \cdot s) \cdot (L2^*/M^*)(1/\phi2d^*)(r1^* \cdot Iq^* + \omega1^* \cdot (M^*/L2^*) \cdot \phi2d^* + \Delta Vq - (r1^* + r2'^* + L\sigma^* \cdot s) \cdot Iq) \quad (12)$$

Here, T1 is a control parameter for determining an estimated response.

The d-axis motor voltage Vd and q-axis motor voltage Vq of the induction motor 30 respectively satisfy equations (13) and (14) derived from the equations (3), (4), (5) and (6).

$$Vd = (r1 + r2' + L\sigma \cdot s) \cdot Id - \omega1 \cdot L\sigma \cdot Iq - (r2'/M) \cdot \phi2d - \omega r \cdot (M/L2) \cdot \phi2q \quad (13)$$

$$Vq = \omega1 \cdot L\sigma \cdot Id + (r1 + r2' + L\sigma \cdot s) \cdot Iq + \omega r \cdot (M/L2) \cdot \phi2d - (r2'/M) \cdot \phi2q \quad (14)$$

When Id*=Id and Iq*=Iq, the equations (1) and (2) expressing the (reference) voltage command values are equal to the equations (13) and (14) expressing the motor voltages, respectively. Therefore, the d-axis voltage variation ΔVd and q-axis voltage variation $\Delta Vq$ are compensated by the d-axis current controller 20 and q-axis current controller 21 in response to a deviation of the d-axis current Id from the d-axis current command value Id* and a deviation of the d-axis current Iq from the q-axis current command value Iq*, respectively. These are the basic operations of a sensorless vector control with a current controller.

The operating principle of the parameter determining unit 1 will now be described.

When determining the motor parameters, a periodic current variation command value Idh* is added to the d-axis current command value Id*; therefore, the voltage variation $\Delta Vd$, which is the output the d-axis current controller 20, is the sum of the basic voltage variation $\Delta Vdb$ and the periodic voltage variation $\Delta Vdh$ ($=\Delta Vd^{**}$.) As will be described later, if the $\Delta Vd$ value is integrated, the $\Delta Vdb$ value has no influence on the determination of the motor parameters. Therefore, considering only factors influencing on the parameter determination yields an equation (15) for the output Vd* of the voltage command value calculator 13.

$$Vd^* = \Delta Vdh + r1^* \cdot Idh^* + r2'^* \cdot Idh^* + L\sigma^* \cdot s \cdot Idh^* \quad (15)$$

On the other hand, the equation (13) can be reduced to an equation (16) expressing the Idh related component of the d-axis motor voltage Vd.

$$Vd = (r1 + r2' + L\sigma \cdot s) \cdot Idh \quad (16)$$

When Idh*=Idh, the equations (15) and (16) yields an equation (17) for the periodic voltage variation $\Delta Vdh$ outputted from the d-axis current controller 20.

$$\Delta Vdh = \Delta(r1 + r2') \cdot Idh + \Delta L\sigma \cdot s \cdot Idh \quad (17)$$

Here, $\Delta(r1+r2')$ and $\Delta L\sigma$ are expressed by equations (18) and (19) respectively.

$$\Delta(r1+r2') = (r1+r2') - (r1^* + r2'^*) \quad (18)$$

$$\Delta L\sigma = L\sigma - L\sigma^* \quad (19)$$

That is, when there arises a variation $\alpha$ (r1+r2') from the reference value (r1+r2') or a variation $\Delta L\sigma$ from the reference value $L\sigma$, the d-axis current controller 20 generates a variation $\Delta Vdh$ by an amount corresponding to the variation $\Delta$ (r1+r2') or $\Delta L\sigma$. In the equation (17), the $\Delta Vdh$ value includes the values of $\Delta$ (r1+r2') and $\Delta L\sigma$. The present embodiment determines the values of $\Delta(r1+r2')$ and $\Delta L\sigma$ from the $\Delta Vd$ value independently of each other.

As seen from the equation (17), when Idh≠0, the $\Delta Vdh$ value includes the $\Delta$ (r1+r2') related component. Further, it includes the $\Delta L\sigma$ related component when the Idh value changes, while the $\Delta L\sigma$ related component is equal to 0 when the Idh value stays constant. Therefore, if a quasi-square wave signal is superimposed on the d-axis current command value as a periodically varying current component, the $\Delta$ (r1+r2') related component is dominant in the $\Delta Vdh$ value during the Idh value stays substantially constant. On the other hand, the $\Delta L\sigma$ related component is dominant during the $\Delta Vdh$ value changes (i.e., rises or falls.)

If the $\Delta Vdh$ value is integrated over the period during which the quasi-square wave signal is substantially constant and its sine is positive, while the negative of the $\Delta Vdh$ value ($-\Delta Vdh$) is integrated over the above period and the sine is negative, then the $\Delta$ (r1+r2') related component can be integrated over time. On the other hand, if the values of $\Delta Vdh$ and $-\Delta Vdh$ are integrated over the period during which the quasi-square wave signal changes in a similar manner, then the $\Delta L\sigma$ related component can be integrated over time.

Since the motor parameters are determined by integrating the $\Delta Vdh$ value over time, the basic voltage variation $\Delta Vdb$ (DC component) is cancelled, thus preventing introduction of error caused by the dead time of the inverter 10 or on-state voltage drop in the inverter 10 devices. This removes the aforementioned problem of reduced accuracy.

The parameter determining unit 1 uses: the sum of the (r1*+r2'*) set value and the $\Delta$ (r1+r2') related integral; and the sum of the $L\sigma^*$ set value and the $\Delta L\sigma$ related integral to calculate the voltage compensation value $\Delta Vd^{}$, which is added to the voltage command value calculator 13. Since, the $\Delta Vdh$ value converges to zero with time, the $\Delta$ (r1+r2') related and $\Delta L\sigma$ related integrals converge to certain values, and thereby the resistance variation $\Delta$ (r1+r2') and leakage inductance variation $\Delta L\sigma$ can be determined independently of each other. Here, the reason why the $\Delta Vdh$ value converges to zero is that the $\Delta Vd^{}$ value compensates the current deviation $\Delta id$ ($\neq \Delta id^{}$) caused by parameter variations, and causes the $\Delta id$ value to become equal to the $\Delta id^{}$ value. This will be described in detail below.

Figure 2:
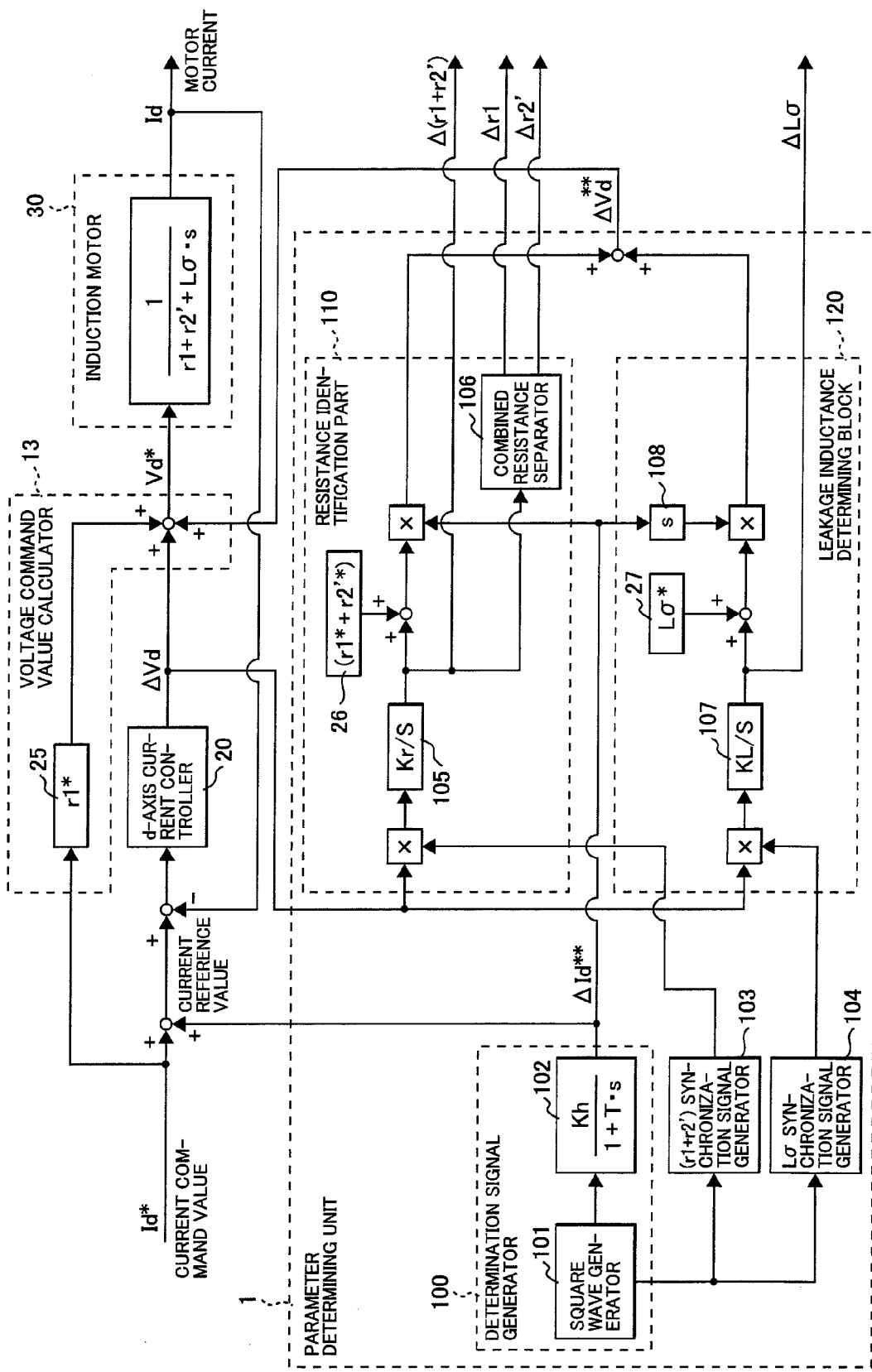
FIG. 2 is a block diagram of a parameter determining unit of a first embodiment of the invention.

FIG. 2 illustrates a detailed configuration of the parameter determining unit 1, which is a feature of the embodiment. FIG. 2 illustrates operations of the d-axis current controller 20, a d-axis circuit of the induction motor 30, a main operational block of the voltage command value calculator 13 and the parameter determining unit 1.

Focusing attention to the d-axis circuit, the induction motor 30 is represented by a delay element which inputs the d-axis voltage command voltage Vd*, outputs the d-axis motor current Id, and includes the primary resistance r1, the secondary resistance r2' converted to the primary side and the leakage inductance $L\sigma$. The current Id is fed back to the input of the d-axis current controller 20 and controlled to achieve a target value of the current reference signal that is the sum of the current command value Id* and the periodic signal $\Delta Id^{**}$.

A value r1*25, value (r1*+r2'*) 26 and value $L\sigma^*$ 27 are a primary resistance set value, a set value for the sum of the primary resistance and the secondary resistance converted to the primary side and a leakage inductance set value, respectively. The parameter determining unit 1 includes a determination signal generator 100, resistance determining block 110, leakage inductance determining block 120, (r1+r2') synchronization signal generator 103 and $L\sigma$ synchronization signal generator 104.

The determination signal generator 100 includes a square wave generator 101 and a first order delay circuit 102, where the square wave generator 101 outputs the square wave signal (rectangular wave signal), which is inputted to the first order delay circuit 102. The first order delay circuit 102 multiplies the input signal by a predetermined gain Kh and others and generates the quasi-square wave determination signal $\Delta Id^{}$ which is a periodic signal. The determination signal $\Delta Id^{}$ is added to the d-axis current command value Id* to generate the current reference signal. Further, the parameter determining unit 1 uses the resistance determining block 110 and leakage inductance determining block 120 to determine the resistance variation $\Delta$ (r1+r2') and leakage inductance variation $\Delta L\sigma$ of the induction motor 30 independently of each other.

Figure 3:
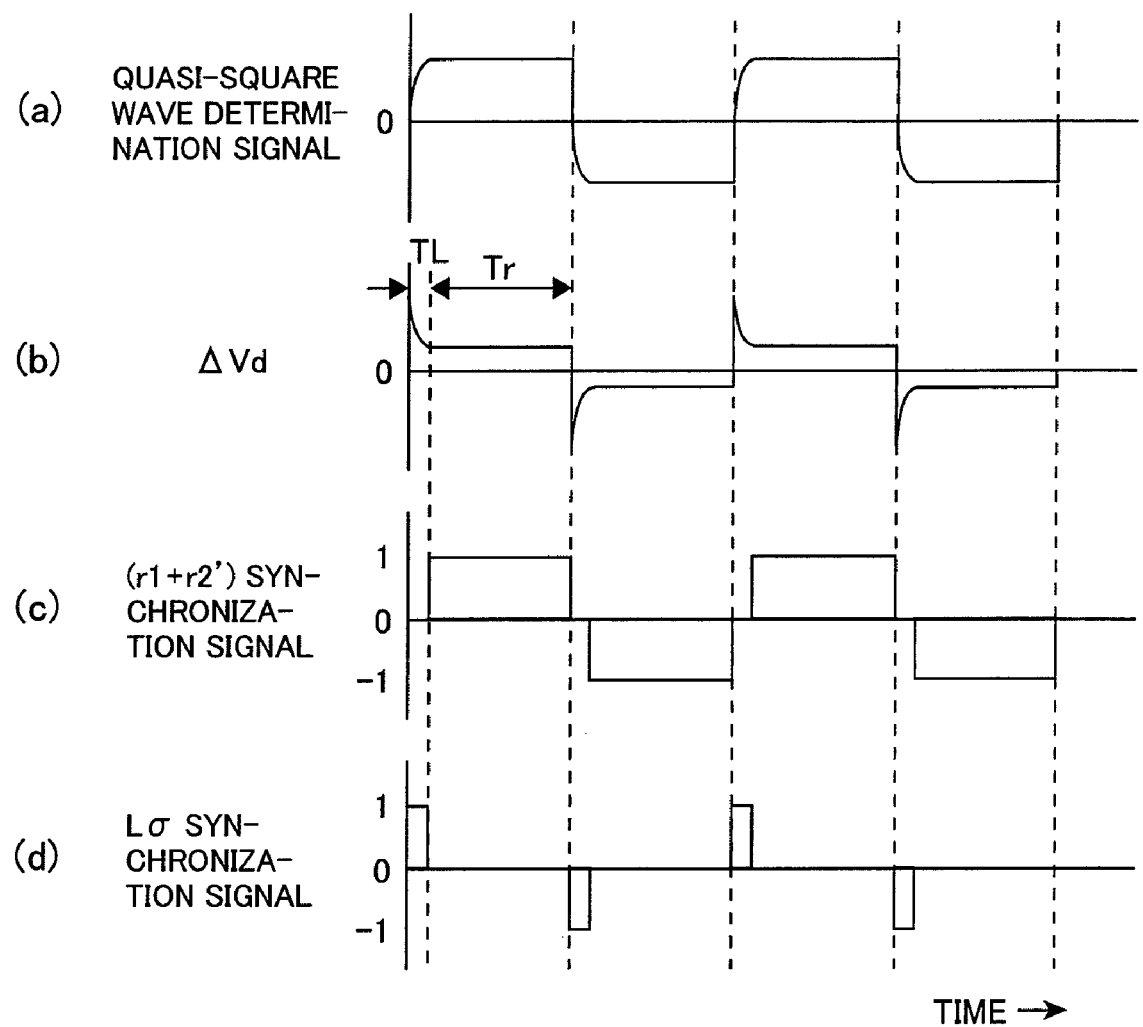
FIG. 3 illustrates waveforms of a square wave determination signal and synchronization signals of a first embodiment of the invention.

FIGS. 3(*a*), 3(*b*), 3(*c*) and 3(*d*) illustrate the quasi-square wave determination signal $\Delta Id^{}$, $\Delta Vd$ waveform, (r1+r2') synchronization signal and $L\sigma$ synchronization signal, respectively. The first order delay circuit 102 (FIG. 2) causes a delay in the rise and fall time of the quasi-square wave determination signal $\Delta Id^{}$ as shown in FIG. 3(*a*). The $\Delta Vd$ signal in FIG. 3(*b*) consists of a transient period (delay time) TL and a given remaining time Tr until the sine reverses. The synchronization signal in FIG. 3(*c*) from the (r1+r2') synchronization signal generator 103 (FIG. 2) is synchronized with the quasi-square wave determination signal in FIG. 3(*a*), and it is 0 during the ΔVd transient period TL, while, during the remaining period Tr, it is +1 when the determination signal is positive and −1 when negative.

Turning to FIG. 2, the resistance determination block 110 multiplies the voltage variation ΔVd which outputted from the d-axis current controller 20 by the output of the (r1+r2') synchronization signal generator 103, and the multiplication product is integrated by the integrator 105 to determine the resistance variation Δ (r1+r2').

A combined resistance separator 106 separates the determined resistance variation Δ (r1+r2') into Δ r1 and Δ r2'. Specifically, the separation can be carried out using either the equations (20), (21) or the equations (22), (23) by assuming that the variation rate of the primary resistance r1 is equal to that of the secondary resistance r2.

$$\Delta r1 = (r1^*/r2^*) \cdot \Delta r2' \qquad (20)$$

$$\Delta r2' = \Delta(r1+r2')(r1^*/r2^*+1) \qquad (21)$$

$$\Delta r1 = \Delta(r1+r2')/(r2^*/r1^*+1) \qquad (22)$$

$$\Delta r2' = (r2^*/r1^*) \cdot \Delta r1 \qquad (23)$$

Here, r1* and r2* are respectively primary and secondary resistance reference values.

On the other hand, the leakage induction determining block 120 multiplies the ΔVd value by the output of the Lσ synchronization signal generator 104 and integrates the multiplication product at a multiplier 107 to determine the leakage induction variation ΔLσ. The output signal in FIG. 3(d) from the Lσ synchronization signal generator 104 (FIG. 2) is synchronized with the quasi-square wave determination signal shown in FIG. 3(a) which is generated by the square wave generator 101 (FIG. 2). And this output signal is, during the ΔVd transient period TL, is +1 when the square wave signal is positive and −1 when negative, while it is 0 during the remaining period Tr other than the ΔVd transient period.

Turning to FIG. 2, the voltage compensation value ΔVd** corresponding to the (r1+r2') related motor parameter is calculated by adding the (r1*+r2'*) set value 26 and the determined resistance variation Δ (r1+r2') and multiplying the sum by the determination signal ΔId. On the other hand, the voltage compensation value ΔVd corresponding to the leakage inductance Lσ is calculated by adding the Lσ set value 27 and the determined leakage inductance variation ΔLσ and multiplying the sum by the output of a differentiator 108 which is the derivative of the ΔId** value.

Then, the voltage compensation value ΔVd** is calculated from: the sum of the (r1*+r2'*) set value and the Δ (r1+r2') related integral (output of the integrator 105); and the sum of the set value Lσ* and the Lσ* related integral (output of the integrator 107), and the resulting voltage compensation value is added at the voltage command value calculator 13. Since the ΔVdh value converges to zero with time, the Δ (r1+r2') related and ΔLσ related integrals converge to certain values, and thereby the resistance variation Δ (r1+r2') and leakage inductance variation ΔLσ can be determined independently of each other. In addition, the Δr1 and Δr2' values are separated at the combined resistance separator 106, and the leakage inductance variation ΔLσ is outputted from the integrator 107 to determine the motor parameters, and these values are then added to the set values r1*, r2'* and Lσ* respectively to reset the control parameters of the controller 300. In other words, the control parameters of the controller 300 are set based on the determined motor parameters.

As has been described above, according to the embodiment, the resistance variations Δr1 and Δr2' and the leakage inductance variation ΔLσ, which are the determined motor parameter variations, are each added to the corresponding reference value to reset the control parameters of the controller 300, thus preventing degradation in controllability of the motor's velocity and torque which may be caused by inappropriate setting of motor parameters or variation in such parameters during operation.

A Second Embodiment

Although the first embodiment described above uses the square wave generator 101 to add the quasi-square wave signal (quasi-rectangular wave signal) to the d-axis current command value, a sinusoidal wave signal may be added.

Figure 4:
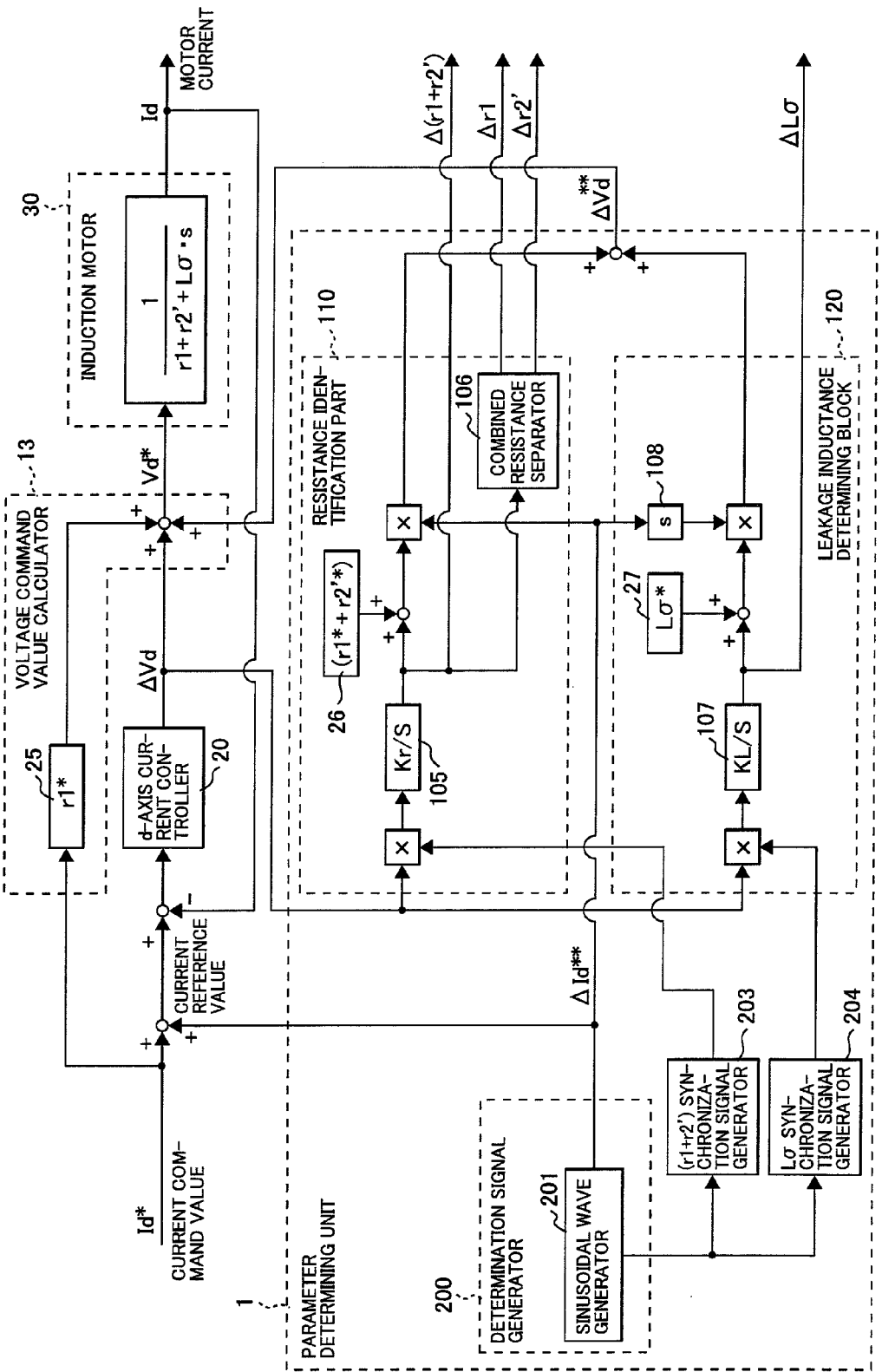
FIG. 4 is a block diagram of a parameter determining unit of a second embodiment of the invention.
Figure 5:
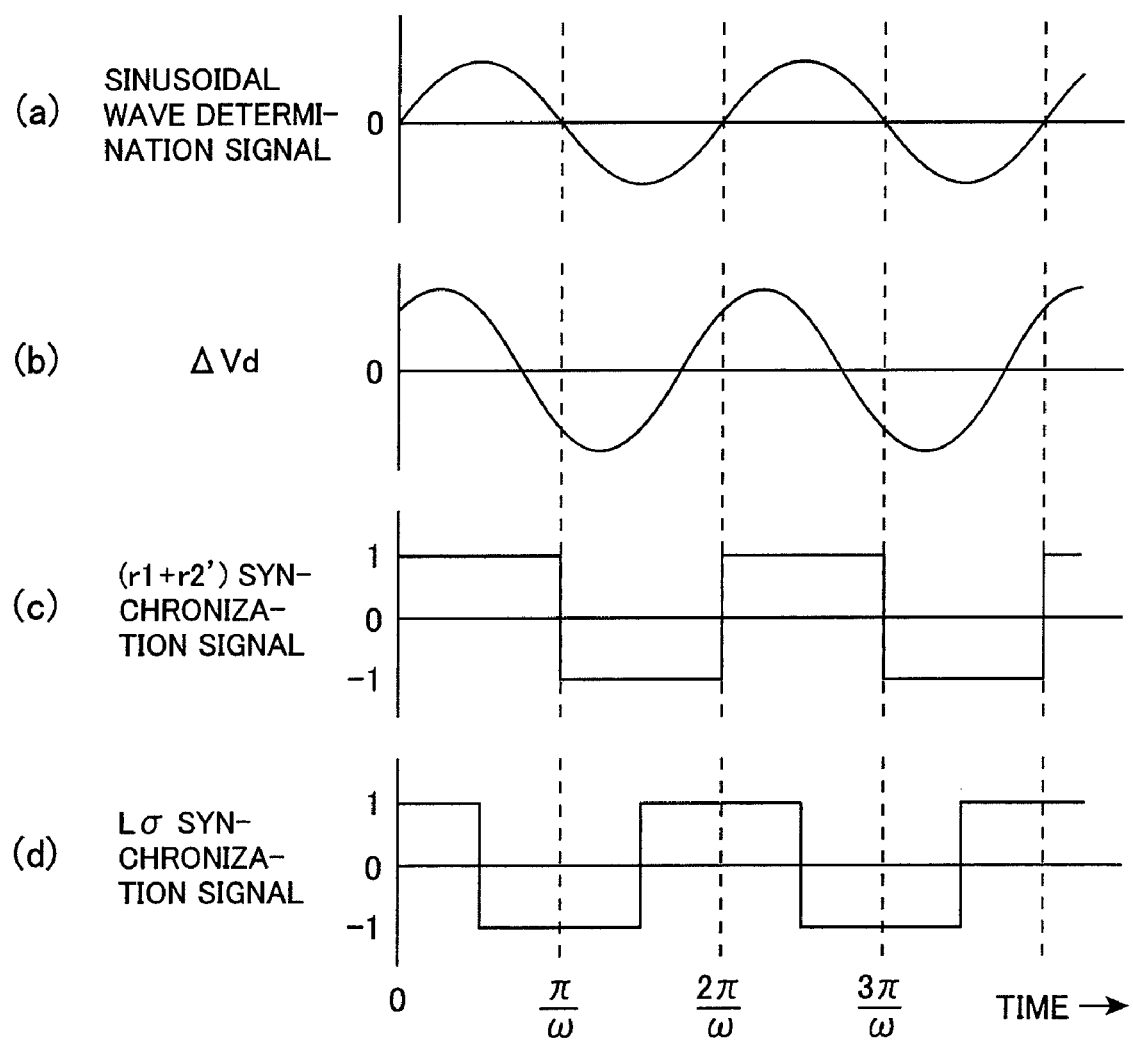
FIG. 5 illustrates waveforms of a sinusoidal wave determination signal and synchronization signals of a second embodiment of the invention.

A parameter determining unit according to a second embodiment of the invention will be described with reference to FIGS. 4 and 5. In FIG. 4, a determination signal generator 200 is configured with a sinusoidal wave generator 201, while a (r1+r2') synchronization signal generator 203 and a Lσ synchronization signal generator 204 are different from those used in the first embodiment of FIG. 2. The other parts are identical to corresponding parts in FIG. 2, and therefore are numbered in the same manner as FIG. 2 and will not be described again here. The operating principle will first be described.

When Idh in the equation (17) is a sinusoidal wave Ids·sin ωt having an amplitude of Ids and an angular frequency of ω, the equation (17) is modified to an equation (24).

$$\Delta Vds = \Delta(r1+r2') \cdot Ids \cdot \sin \omega t + \Delta L\sigma\sigma \cdot \omega \cdot Ids \cdot \cos \omega t \qquad (24)$$

Integrating the equation (24) over time from 0 to π/ω gives an equation (25).

[Mathematical Expression 1]

$$\int_0^{\pi/\omega} (\Delta Vds) dt = \Delta(r1+r2') \cdot 2/\omega \cdot Ids \qquad (25)$$

Further, integrating the equation (24) over time from π/(2ω) to 3π/(2ω) gives an equation (26).

[Mathematical Expression 2]

$$\int_{\pi/(2\omega)}^{3\pi/(2\omega)} (\Delta Vds) dt = \Delta L\sigma \cdot 2Ids \qquad (26)$$

Therefore, when a sinusoidal wave signal is superimposed on a d-axis current command value as a periodically varying current component, a Δ (r1+r2') related component can be calculated by integrating the superimposed value from t=nπ/ω to t=(n+1) π/ω (n=integer), while a ΔLσ related component can be calculated by integrating the superimposed value from t=(n+1/2) π/ω to t=(n+3/2) π/ω. Then, a voltage compensation value ΔVd** is calculated from: the sum of an (r1*+r2'*) set value 26 and the Δ (r1+r2') related integral; and the sum of a Lσ* set value 27 and the ΔLσ related integral, and the resulting voltage compensation value is then added at a voltage command value calculator 13. Since, the ΔVds value converges to zero with time, the Δ (r1+r2') related and ΔLσ related integrals converge to certain values, and thereby the resistance variation Δ (r1+r2') and leakage inductance variation ΔLσ can be determined independently of each other. This is the operating principle. The embodiment will presently be described with reference to FIGS. 4 and 5.

In a parameter determining unit 1 of FIG. 4, the determination signal generator 200 includes the sinusoidal wave generator 201, which outputs a sinusoidal wave of a predetermined amplitude to generate a determination signal ΔId. The determination signal ΔId is added to the d-axis current command value to provide a current reference signal. A d-axis current controller 20 inputs a deviation between a d-axis current and the current reference signal and outputs a voltage variation ΔVd, which is inputted to the parameter determining unit 1 to determine the resistance variation Δ (r1+r2') and leakage inductance variation ΔLσ of an induction motor 30 independently of each other.

FIGS. 5(a), 5(b), 5(c) and 5(d) illustrate the sinusoidal wave determination signal, ΔVd waveform, (r1+r2') synchronization signal and Lσ synchronization signal, respectively. A resistance determination unit 110 (FIG. 4) multiplies the voltage variation ΔVd outputted from the d-axis current controller 20 by the output of the (r1+r2') synchronization signal generator 203 (FIG. 4), and the multiplication product is integrated by an integrator 105 to determine the resistance variation Δ (r1+r2'). The output signal of the (r1+r2') synchronization signal generator 203 (FIG. 4) is synchronized with the sinusoidal wave as shown in FIG. 5(c). During the period from t=nπ/ω to t=(n+1) π/ω), this output signal is +1 when the sine of the sinusoidal wave signal is positive and −1 when the sine is negative.

On the other hand, the leakage induction variation ΔLσ can be determined by a leakage induction determining block 120, which multiplies the ΔVd value by the output of the Lσ synchronization signal generator 204 and integrates the multiplication product at a multiplier 107. The output signal of the Lσ synchronization signal generator 204 leads the sinusoidal wave by π/2 as shown in FIG. 5(d). During the period from t=(n+1/2) π/ω to t=(n+3/2) π/ω, this output signal is +1 when the slope of sinusoidal wave signal is positive and −1 when the slope is negative.

(Modifications)

The present invention is not limited to the embodiments above, but covers modifications as described below.

(1) Although quasi-square and sinusoidal wave signals are respectively used for superimposition in the first and second embodiments, a triangular wave, which is a periodic signal, may also be used. FIG. 6 illustrates an example of a triangular wave determination signal, ΔVd, a (r1+r2') synchronization signal, and a Lσ synchronization signal.

(2) Although the embodiments above control a motor to acquire a target velocity a velocity command value ωr*, the present invention also includes torque controls.

(3) Although the embodiments above determine Δ (r1+r2') which is a variation in the sum of a primary resistance and a secondary resistance converted the primary side, the same results can be obtained by determining (Δr1+Δr2') which is the sum of: Δr1, a variation in a primary resistance; Δr2', a variation in a secondary resistance converted to the primary side.

(4) The embodiments above determine: Δ (r1+r2') which is a variation in the sum of a primary resistance and a secondary resistance converted to the primary side; and ΔLα which is a variation in a leakage inductance. However, the values of (r1+r2') and Lσ can be determined if a (r1*+r2'*) set value 26 and a Lσ* set value 27 are set at 0, or such set values are removed.

What is claimed is:

1. An induction motor controller, comprising:
   a circuit for generating a d-axis current reference signal from a d-axis current command value and a periodically varying periodic signal;
   a d-axis current controller for controlling a d-axis motor current flowing through an induction motor to be controlled to match the d-axis current reference signal; and
   parameter determining means for calculating and determining a motor parameter of the induction motor based on a deviation of the d-axis motor current from the d-axis current reference signal, and controlling a voltage applied to the induction motor using a compensation voltage calculated from the calculated and determined motor parameter,
   wherein a control parameter for controlling the induction motor is set based on the calculated and determined motor parameter.

2. The induction motor controller according to claim 1, wherein the calculation and determination use an output of the d-axis current controller which generates a d-axis voltage variation of the voltage applied to the induction motor in order to control the d-axis motor current to match the d-axis current reference signal based on a deviation of the d-axis motor current from the d-axis current reference signal.

3. The induction motor controller according to claim 1, wherein the periodic signal is a quasi-square wave signal, and wherein the parameter determining means integrates, over a time period during which the amplitude of the quasi-square wave signal is substantially constant, either a value corresponding to the deviation of the d-axis motor current from the d-axis current reference signal or a d-axis voltage variation outputted from the d-axis current controller in order to calculate and determine, as the motor parameter, a combined resistance variation Δ(r1+r2') where r1 and r2' are respectively a primary resistance and a secondary resistance converted to the primary side, each being the motor parameter.

4. The induction motor controller according to claim 3, wherein a primary resistance variation Δr1 and a secondary resistance variation Δr2' converted to the primary side are separately calculated from the combined resistance variation Δ(r1+r2') using r1* and r2*, where r1, r2', r1* and r2* are respectively a primary resistance, a secondary resistance converted to the primary side, and primary and secondary resistance reference values before a variation.

5. The induction motor controller according to claim 4, wherein the primary resistance variation Δr1 is added to the primary resistance set value r1* before a variation, or the secondary resistance variation Δr2' converted to the primary side is added to the secondary resistance set value r2' converted to the primary side before a variation to obtain the control parameter.

6. The induction motor controller according to claim 1, wherein the periodic signal is a quasi-square wave signal, and wherein the parameter determining means integrates, over a transient time period of the quasi-square wave signal, either a value corresponding to the deviation of the d-axis motor current from the d-axis current reference signal or a d-axis voltage variation outputted from the d-axis current controller in order to calculate and determine, as the motor parameter, a leakage inductance variation of the induction motor.

7. The induction motor controller according to claim 1, wherein the periodic signal is a sinusoidal wave signal of an angular frequency ω or a triangular wave signal, and wherein the parameter determining means integrates over a time period during which the phase of the sinusoidal or triangular wave signal is from nπ/ω to (n+1)π/ω (where n is an integer): an operand value, which is either a value corresponding to the deviation of the d-axis motor current from the d-axis current reference signal or a d-axis voltage variation outputted from the d-axis current controller, when the sign of the periodic signal is positive; and the negative of the operand value when the sign of the periodic signal is negative in order to calculate and determine, as the motor parameter, a variation in a combined resistance of primary and secondary resistances of the induction motor, or the parameter determining means integrates over a time period during which the phase of the sinusoidal or triangular wave signal is from (n+1/2)π/ω to (n+3/2)π/ω (where n is an integer): the operand value when the sign of the periodic signal is positive; and the negative of the operand value when the sign of the periodic signal is negative in order to calculate and determine, as the motor parameter, a variation in a leakage inductance of the induction motor.

8. The induction motor controller according to claim 7, wherein a primary resistance variation $\Delta r1$ and a secondary resistance variation $\Delta r2'$ converted to the primary side are separately calculated from the combined resistance variation $\Delta(r1+r2')$ using $r1^*$ and $r2^*$, where r1, r2', $r1^*$ and $r2^*$ are respectively a primary resistance, a secondary resistance converted to the primary side, and primary and secondary resistance reference values before a variation.

9. The induction motor controller according to claim 1, wherein the periodic signal is a quasi-square wave signal, and wherein the parameter determining means integrates, over a time period during which the amplitude of the quasi-square wave signal is substantially constant, either a value corresponding to the deviation of the d-axis motor current from the d-axis current reference signal or a d-axis voltage variation outputted from the d-axis current controller in order to calculate and determine, as the motor parameter, a combined resistance (r1+r2') where r1 and r2' are respectively a primary resistance and a secondary resistance converted to the primary side, each being the motor parameter.

10. The induction motor controller according to claim 9, wherein a primary resistance variation $\Delta r1$ and a secondary resistance variation $\Delta r2'$ converted to the primary side are separately calculated from the combined resistance (r1+r2') using $r1^*$ and $r2^*$, where r1, r2', $r1^*$ and $r2^*$ are respectively a primary resistance, a secondary resistance converted to the primary side, and primary and secondary resistance reference values before a variation.

11. The induction motor controller according to claim 1, wherein the periodic signal is a quasi-square wave signal, and wherein the parameter determining means integrates, over a transient time period of the quasi-square wave signal, either a value corresponding to the deviation of the d-axis motor current from the d-axis current reference signal or a d-axis voltage variation outputted from the d-axis current controller in order to calculate and determine, as the motor parameter, a leakage inductance of the induction motor.

12. The induction motor controller according to claim 1, wherein the periodic signal is a sinusoidal wave signal of an angular frequency $\omega$ or a triangular wave signal, and wherein the parameter determining means integrates over a time period during which the phase of the sinusoidal or triangular wave signal is from $n\pi/\omega$ to $(n+1)\pi/\omega$ (where n is an integer): an operand value, which is either a value corresponding to the deviation of the d-axis motor current from the d-axis current reference signal or a d-axis voltage variation outputted from the d-axis current controller, when the sign of the periodic signal is positive; and the negative of the operand value when the sign of the periodic signal is negative in order to calculate and determine, as the motor parameter, a combined resistance of primary and secondary resistances of the induction motor, or the parameter determining means integrates, over a time period during which the phase of the sinusoidal or triangular wave signal is from $(n+\frac{1}{2})\pi/\omega$ to $(n+\frac{3}{2})\pi/\omega$ (where n is an integer), the operand value when the sign of the periodic signal is positive and the negative of the operand value when the sign of the periodic signal is negative in order to calculate and determine, as the motor parameter, a leakage inductance of the induction motor.

13. The induction motor controller according to claim 12, wherein a primary resistance variation $\Delta r1$ and a secondary resistance variation $\Delta r2'$ converted to the primary side are separately calculated from the combined resistance (r1+r2') using $r1^*$ and $r2^*$, where r1, r2', $r1^*$ and $r2^*$ are respectively a primary resistance, a secondary resistance converted to the primary side, and primary and secondary resistance reference values before a variation.

* * * * *